United States Patent
Kiilerich Pratas et al.

(10) Patent No.: US 12,464,562 B2
(45) Date of Patent: Nov. 4, 2025

(54) COMMUNICATING BETWEEN NODES IN THE UNLICENSED SPECTRUM

(71) Applicant: Nokia Technologies Oy, Espoo (FI)

(72) Inventors: Nuno Manuel Kiilerich Pratas, Gistrup (DK); Erika Portela Lopes De Almeida, Aalborg (DK); Lars Christensen, Aalborg (DK); Jan Hviid, Klarup (DK); Stig Blücher Brink, Aalborg Øst (DK); Karsten Petersen, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 418 days.

(21) Appl. No.: 17/995,022

(22) PCT Filed: Apr. 15, 2020

(86) PCT No.: PCT/EP2020/060503
§ 371 (c)(1),
(2) Date: Sep. 29, 2022

(87) PCT Pub. No.: WO2021/209121
PCT Pub. Date: Oct. 21, 2021

(65) Prior Publication Data
US 2023/0129493 A1  Apr. 27, 2023

(51) Int. Cl.
*H04W 74/08* (2024.01)
*H04W 16/14* (2009.01)
(Continued)

(52) U.S. Cl.
CPC ....... *H04W 74/0808* (2013.01); *H04W 16/14* (2013.01); *H04W 24/08* (2013.01); *H04W 28/0289* (2013.01); *H04W 72/40* (2023.01)

(58) Field of Classification Search
CPC . H04W 74/0808; H04W 16/14; H04W 24/08; H04W 28/0289; H04W 72/40; H04L 5/0055; H04L 5/0057; H04L 27/0006
(Continued)

(56) References Cited

U.S. PATENT DOCUMENTS

| 2019/0174547 A1 | 6/2019 | Khoryaev et al. |
| 2020/0029340 A1 | 1/2020 | He et al. |

(Continued)

FOREIGN PATENT DOCUMENTS

| CN | 110913419 A | 3/2020 |
| WO | 2020/033563 A1 | 2/2020 |

(Continued)

OTHER PUBLICATIONS

"New WID on 5G V2X with NR sidelink", 3GPP TSG RAN Meeting #83, RP-190766, Agenda: 9.1.1, LG Electronics, Mar. 18-21, 2019, 8 pages.
(Continued)

*Primary Examiner* — Ricky Q Ngo
*Assistant Examiner* — Meheret Woldegebreal Kidane
(74) *Attorney, Agent, or Firm* — Barta Jones, PLLC

(57) ABSTRACT

A method performed at a node is described. In response to receipt of a signal in a channel in the unlicensed spectrum, the node initiates a scan on one of the channels in the unlicensed spectrum to determine whether the channel is available for transmitting a response. Based on the channel being available, a response is transmitted that comprises information regarding the quality of the channel and the quality of other channels in the unlicensed spectrum along with an indication as to whether the signal was successfully received and decoded.

6 Claims, 8 Drawing Sheets

Figure 1:
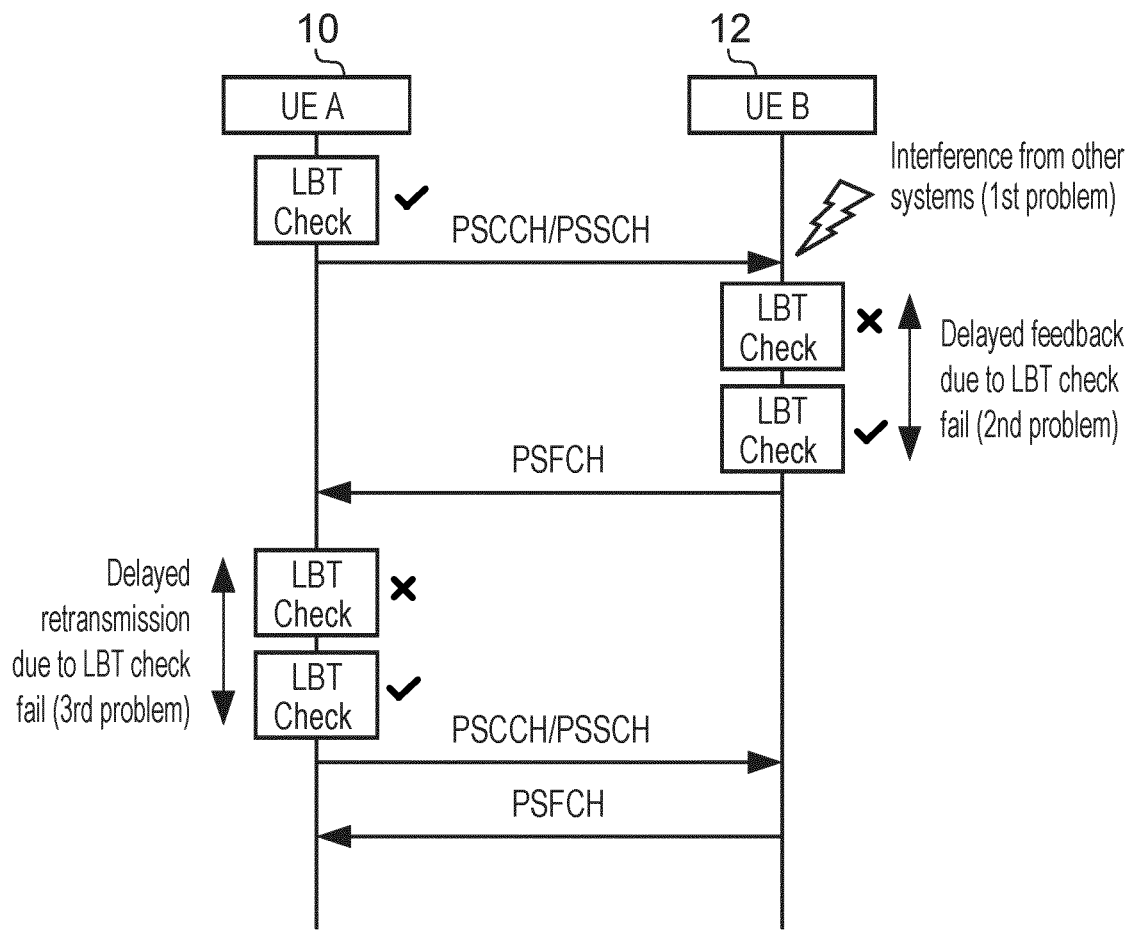

(51) Int. Cl.
*H04W 24/08* (2009.01)
*H04W 28/02* (2009.01)
*H04W 72/40* (2023.01)
*H04W 74/0808* (2024.01)

(58) Field of Classification Search
USPC .......................................................... 370/325
See application file for complete search history.

(56) References Cited

U.S. PATENT DOCUMENTS

| | | | |
|---|---|---|---|
| 2020/0100285 A1 | 3/2020 | Roy et al. | |
| 2021/0083730 A1* | 3/2021 | Hwang | H04L 5/0092 |
| 2022/0085923 A1* | 3/2022 | Ye | H04W 72/02 |

FOREIGN PATENT DOCUMENTS

| | | |
|---|---|---|
| WO | 2020/065057 A1 | 4/2020 |
| WO | 2020/069111 A1 | 4/2020 |

OTHER PUBLICATIONS

"IEEE 802.11", Wikipedia, Retrieved on Feb. 24, 2022, Webpage available at : https://en.wikipedia.org/wiki/IEEE_802.11.

"3rd Generation Partnership Project; Technical Specification Group Radio Access Network; Physical layer procedures for shared spectrum channel access (Release 15)", 3GPP TS 37.213, V15.2.0, Mar. 2019, pp. 1-20.

"NR-U enhancements for HARQ scheduling and feedback", 3GPP TSG RAN WG1 #98, R1-1908685, Agenda: 7.2.2.2.3, Nokia, Aug. 26-30, 2019, 10 pages.

"Resource Allocation Schemes for NR V2X Sidelink Communication", 3GPP TSG RAN WG1 Meeting #95, R1-1812491, Agenda: 7.2.4.1.4, Intel Corporation, Nov. 12-16, 2018, pp. 1-15.

"Offline Summary for NR-V2X Agenda Item—7.2.4.1.4 Resource Allocation Mechanism", 3GPP TSG RAN WG1 Meeting #94, R1-1809867, Agenda: 7.2.4.1.4, Intel Corporation, Aug. 20-24, 2018, pp. 1-5.

Naik et al., "IEEE 802.11bd & 5G NR V2X: Evolution of Radio Access Technologies for V2X Communications", arXiv, Mar. 26, 2019, pp. 1-12.

"3rd Generation Partnership Project; Technical Specification Group Radio Access Network; NR; Physical channels and modulation (Release 15)", 3GPP TS 38.211, V15.7.0, Sep. 2019, pp. 1-97.

"3rd Generation Partnership Project; Technical Specification Group Radio Access Network; NR; Physical layer procedures for control (Release 15)", 3GPP TS 38.213, V15.7.0, Sep. 2019, pp. 1-108.

International Search Report and Written Opinion received for corresponding Patent Cooperation Treaty Application No. PCT/EP2020/060503, dated Dec. 14, 2020, 12 pages.

"Sidelink CSI", 3GPP TSG RAN WG1 Meeting #95, R1-1813553, Agenda: 7.2.4.1.5, Huawei, Nov. 12-16, 2018, 6 pages.

"Mode 2a and Mode 2d for NR V2X Resource Allocation", 3GPP RAN WG1 Meeting AH 1901, R1-1900769, Agenda: 7.2.4.1.4, InterDigital Inc, Jan. 21-25, 2019, 16 pages.

Office Action received for corresponding Chinese Patent Application No. 202080101487.6, dated Jun. 24, 2024, 11 pages of Office Action and no page of translation available.

"Design of Resource Allocation Mode-2 for NR V2X Sidelink Communication", 3GPP TSG RAN WG1 Meeting #99, R1-1912205, Agenda item: 7.2.4.2.2, Intel Corporation, Nov. 18-22, 2019, pp. 1-32.

Office action received for corresponding European Patent Application No. 20721457.8, dated Jul. 12, 2024, 4 pages.

* cited by examiner

COMMUNICATING BETWEEN NODES IN THE UNLICENSED SPECTRUM

RELATED APPLICATION

This application was originally filed as PCT Application No. PCT/EP2020/060503 on Apr. 15, 2020, which is incorporated herein by reference in its entirety.

TECHNOLOGICAL FIELD

Various example embodiments relate to communications within the unlicensed spectrum.

BACKGROUND

In the unlicensed spectrum coexistence with other systems may be provided by using a Listen Before Talk (LBT) mechanism. The unlicensed band is divided into sub-bands or channels each covering a certain frequency band and listen before talk involves the sensing of one of these channels to determine whether it is available prior to transmitting a signal. Where it is available the channel may be acquired by the node for a channel occupancy time COT. During this time signals may be sent and other nodes are deterred from using the channel.

Where signals are transmitted that require a feedback response indicating that the signal has been successfully received then where an LBT mechanism is required for the transmitting device it will also need to be performed for the receiving device before any response can be sent and this may cause undue delays to the response signal, rendering such communications problematic.

It would be desirable to provide a system for communicating in the unlicensed spectrum in a manner which is both efficient and allows coexistence with other systems.

BRIEF SUMMARY

The scope of protection sought for various embodiments of the invention is set out by the independent claims. The examples and features, described in this specification that do not fall under the scope of the independent claims are to be interpreted as examples useful for understanding various embodiments of the invention.

According to various, but not necessarily all, embodiments of the invention there is provided in a first aspect a method performed at an apparatus comprising: in response to receipt of a signal in one of a plurality of channels in unlicensed spectrum, said signal indicating a further apparatus is transmitting data to said apparatus, initiating a scan on at least one of a plurality of channels in the unlicensed spectrum, to determine whether at least one of the plurality of scanned channels is available for transmission;

attempting to decode said data received from said further apparatus; and generating a response comprising acknowledgement data indicating whether said data has been successfully decoded or not and channel quality data indicative of at least one of: a quality and an interference condition of one of the plurality of channels that said signal is received in, and a quality condition of at least one further channel of said plurality of channels in unlicensed spectrum, at least a portion of said response being for transmission to said further apparatus in response to said scan indicating that said at least one of the plurality of scanned channels is available.

When communicating in the unlicensed spectrum, information regarding the quality and/or interference conditions of the potential channels is not always readily available and channel scanning mechanisms such as listen before talk or clear channel assessment that need to be performed before a signal can be sent can be time consuming, particularly where the scanning procedure fails one or multiple times due to channel congestion. Also the quality of a channel at a transmitting apparatus such as a network node may be different to the quality of the channel at the receiving apparatus due to interference from hidden nodes and these differences can increase the failure rate.

Mitigation of at least some of these issues can be addressed by using the opportunity that communication of a feedback response signal between the receiving apparatus and transmitting apparatus provides to transmit further information from the receiving apparatus indicative of the channel quality at the receiving apparatus. Such information can then be used at the transmitting device to improve future communications between the nodes.

Conventionally a response has simply indicated whether the data has been successfully decoded or not and there is no indication as to why the decoding may have failed or of what other channel conditions may be at the receiving apparatus. Providing an indication as to why the decoding may have failed along with indications of both the channel quality of the channel the signal is received and of other channels in the unlicensed band may facilitate the procedure and any retransmission of signals by the transmitting apparatus.

The channel may be a sub-band in the unlicensed spectrum that the apparatus is operating in. The quality of the channel is indicative of how strong a desired signal, that is one transmitted between the apparatus and further apparatus is on receipt, while the interference conditions relate to what other signals are present masking the desired signal. The channel quality and the interference conditions both affect how easy it is to decode the signal and indications of one or both for the channel the desired signal is received in may be transmitted, while an indication of the channel quality for at least one and in some cases all of the other plurality of channels may also be transmitted in the response.

In some embodiments, the method further comprises: in response to an initial scan indicating that said at least one of said plurality of channels is not available initiating at least one subsequent scan on said at least one of said plurality of channels until said on said at least one of said plurality of channel is sensed to be available.

The channel scan may not be successful in which case a subsequent scan will be performed either until a channel is sensed to be available or until a predetermined number of scans have been performed.

In some embodiments, the method further comprises in response to said scan indicating one of said plurality of channels that has been scanned is available, determining whether a time elapsed since receipt of said signal is greater than a predetermined time; and where not initiating transmission of said channel quality data prior to transmission of said acknowledgement data; and where so initiating transmission of at least a portion of said channel quality data after transmission of said acknowledgement data.

Embodiments make use of the fact that the time taken to generate the acknowledgement part of the response includes the time for decoding the data payload and indeed the time to enable the transmission of the response. Thus, the channel quality data much of which may be assessed by the apparatus in the background may be ready for transmission as soon as the transmitter is itself ready and it may therefore be advantageous to control the transmission such that the channel quality data is transmitted before the acknowledgement data in many cases. However, where the channel scan fails then any response will be delayed and in which case, it may be preferable not to delay transmission of the acknowledgement data and thus, some or indeed all of the channel quality data may be transmitted after the acknowledgement data in cases where the response has been delayed.

In some embodiments, a size of said at least a portion of said channel quality data that is transmitted after said acknowledgement data is dependent upon a delay in transmitting said response.

As noted previously where the channel scan fails then any response will be delayed and in which case, it may be preferable not to delay transmission of the acknowledgement data and thus, some or indeed all of the channel quality data may be transmitted after the acknowledgement data. In effect the method seeks to transmit acknowledgement data without undue delay and thus, the larger the delay in starting the transmission due to the channel scan failing, the larger the portion of the channel quality data that may be transmitted after the acknowledgement data.

In some embodiments, the method further comprises: determining data of at least one of said quality and interference conditions of at least some of said plurality of channels by performing at least one of:

determining a received signal reference power in the one of said plurality of channels said signal is received in;

determining a received signal strength indication for at least some of said plurality of channels including the one of said plurality of channels said signal is received in; and where said signal has not been successfully decoded determining data indicative of the cause of failure based on the received signal strength indication and received signal reference power; and generating said response from said determined data.

Although the response may have a number of forms, it may be a TCP feedback signal or a higher layer RLC feedback signal or another higher layer feedback signal, however in some embodiments said response indicating said data has been successfully decoded is a HARQ (hybrid automatic repeat request) response.

In some embodiments, the method comprises an initial step of receiving said signal at said apparatus in one of said plurality of channels in unlicensed spectrum; and a final step of transmitting said response signal to said further apparatus.

In some embodiments, said step of initiating a scan comprises initiating a scan on said one of said plurality of channels that said signal is received in.

In some embodiments the apparatus transmits a response in and therefore scans the same channel or sub-band that the signal is received in. In other embodiments the apparatus may be configured to scan multiple channels or sub-bands, either in parallel or multiplexed in time. In such a case the response is transmitted in a channel that is available. In a case where the scan reveals that none of the channels are available then the apparatus scans the channels again as it does in the case where only one sub-band is scanned. The multiple channels may be scanned again in parallel.

In some embodiments, said scan comprises performing one of a listen before talk check and a clear channel assessment.

In some embodiments, said listen before talk check is performed without waiting for a random backoff window.

In some embodiments, where the scan is a listen before talk check the channel that the desired signal is received in has been acquired by the transmitting apparatus subsequent to its own listen before talk procedure for a channel occupancy time COT. Where the response signal is to be transmitted in the same sub band, it is likely that this channel is still acquired and thus, the listen before talk check, only listens for a short period and can transmit a response if free, or listen again in a sequential period without the need for random backoff.

According to various, but not necessarily all, embodiments of the invention there is provided according to a second aspect a method performed at an apparatus comprising: selecting one of a plurality of channels in unlicensed spectrum for transmission of a signal to at least one further apparatus;

initiating a scan on said selected one of said plurality of channels;

in response to said scan indicating that said selected one of said plurality of channels is available initiating transmission of said signal to said at least one further apparatus;

in response to receiving a response from said at least one further apparatus said response comprising acknowledgement data indicative as to whether said signal has been successfully decoded or not, and channel quality data indicative of at least one of a quality and an interference condition of said selected one of said plurality of channels and a quality condition of at least one further channel of said plurality of channels in unlicensed spectrum, said method comprises storing said channel quality data within a data store on said apparatus.

In some embodiments, said step of selecting said one of said plurality of channels is performed in dependence upon said stored channel quality data.

In some embodiments where the apparatus has received channel quality data from responses of the further apparatus, then in such embodiments the selecting of the channel may be performed in dependence upon this stored channel quality data thereby improving the probability of the data being successfully transmitted and decoded.

In some embodiments, in response to said response from said at least one further apparatus indicating that said signal has not been successfully received and decoded, selecting one of said plurality of channels for retransmission of said signal in dependence upon said stored channel quality data.

Similarly, where a response is received from the further apparatus indicating that the data has not been successfully received and decoded then the data indicative of the channel quality that is transmitted along with this response or an earlier response may be used for the selection of a subsequent channel for re-transmission of the signal.

In some embodiments, said response indicating whether said data has been successfully decoded comprises a HARQ response.

In some embodiments, said scan of said at least one of said plurality of channels comprises performing one of a listen before talk check and a clear channel assessment.

In some embodiments, said listen before talk check is performed without waiting for a random backoff window.

In some embodiments, where the scan is a listen before talk check and the channel being scanned is the one that the desired signal has been received on then as this has been acquired by the transmitting apparatus subsequent to its own listen before talk procedure for a channel occupancy time COT, then as the response signal is to be transmitted on the same channel, it is likely that this channel is still acquired and thus, the listen before talk check for the response, only listens for a short period and can transmit a response if free, or listen again in a sequential period without the need for random backoff.

In effect a category 2 or in some cases a category 1 listen before talk check is able to be performed as the channel has been acquired by the transmitting device. This means that there is no requirement to wait for a random backoff window and the delay due to waiting for a random backoff window before performing this check which is required in a category 4 listen before talk procedure is avoided.

In other embodiments, where the channel has not already been acquired then the scan comprises a listen before talk check and said method comprises prior to performing the listen before talk check waiting for a random backoff time and if said listen before talk check is unsuccessful repeating the listen before talk check. When the listen before talk check is successful and the apparatus detects that the channel is free, the apparatus transmits the signal and the channel is acquired for the channel occupation time COT. In effect the listen before talk check is a category 4 listen before talk check.

Various example embodiments may provide a method performed at an apparatus according to a first aspect and a second aspect.

In this regard, an apparatus may be configured simply to transmit the signals or receive the signals but in many cases an apparatus will be configured to perform both transmission and receipt.

Various example embodiments provide a computer program operable when executed on a processor to perform the method of at last one of a first and second aspect.

Various example embodiments provide a computer program comprising instructions for causing an apparatus to perform the following:
  in response to receipt of a signal in one of a plurality of channels in unlicensed spectrum, said signal indicating a further apparatus is transmitting data to said apparatus, initiate a scan on at least one of said plurality of channels in unlicensed spectrum, to determine whether at least one of said plurality of scanned channels is available for transmission;
  attempt to decode said data received from said further apparatus; and
  generate a response comprising acknowledgement data indicating whether said data has been successfully decoded or not and channel quality data indicative of at least one of:
  a quality and an interference condition of the one of said plurality of channels that said signal is received in, and
  a quality condition of at least one further channel of said plurality of channels in unlicensed spectrum, at least a portion of said response being for transmission to said further apparatus in response to said scan indicating that said at least one of said plurality of scanned channels is available.

Various example embodiments provide a computer program comprising instructions for causing an apparatus to perform the following:
  select one of a plurality of channels in unlicensed spectrum for transmission of a signal to at least one further apparatus;
  initiate a scan on said selected one of said plurality of channels;
  in response to said scan indicating that said selected one of said plurality of channels is available initiate transmission of said signal to said at least one further apparatus;
  in response to receiving a response from said at least one further apparatus said response comprising acknowledgement data indicative as to whether said signal has been successfully decoded or not, and channel quality data indicative of at least one of a quality and an interference condition of said selected one of said plurality of channels and a quality condition of at least one further channel of said plurality of channels in unlicensed spectrum, said method comprises storing said channel quality data within a data store on said apparatus.

A further example embodiment provides in a further aspect an apparatus comprising:
  means for receiving a signal in one of a plurality of channels in unlicensed spectrum, said signal indicating a further apparatus is transmitting data to said apparatus;
  means for performing a scan on at least one of said plurality of channels in unlicensed spectrum to determine whether the at least one of said plurality of scanned channels is available for transmission;
  means for decoding said data;
  means for generating a response, said response comprising response data indicative of whether said data has been successfully decoded and channel quality data indicative of at least one of:
  a quality and an interference condition of said one of said plurality of channels that said signal is received in, and of
  a quality of at least one further channel of said plurality of channels in unlicensed spectrum; and
  means for transmitting at least a portion of said response in response to determining that said at least one of said plurality of scanned channels is available.

In some embodiments, said apparatus further comprises: means for controlling said transmitter to transmit said response, said means for controlling comprising means for determining whether a time elapsed since receipt of said signal is greater than a predetermined time, said means for controlling being responsive to said determined elapsed time being less than said predetermined time to control said transmitter to initiate transmission of said channel quality data prior to transmission of said acknowledgement data; and being responsive to said determined elapsed time being greater than said predetermined time to initiate transmission of at least a portion of said channel quality data after transmission of said acknowledgement data.

In some embodiments, said apparatus further comprises means for determining data of at least one of said quality and interference conditions of at least some of said plurality of channels by performing at least one of:
  determining a received signal reference power in said one of the plurality of channels said signal is received in;
  determining a received signal strength indication for at least some of said plurality of channels including said one of the plurality of channels that said signal is received in; and
  where said signal has not been successfully decoded determining data indicative of the cause of failure based on the received signal strength indication and received signal reference power; and
  said means for generating said response is configured to generate said response from said determined data.

Various example embodiments provide in a yet further aspect an apparatus comprising:

means for selecting one of a plurality of channels in unlicensed spectrum for transmitting a signal to at least one further apparatus;

means for performing a scan on said selected one of said plurality of channels;

means for transmitting said signal to said at least one further apparatus on said selected one of said plurality of channels in response to said scan indicating that said selected one of said plurality of channels is available; and means for receiving a response from said at least one further apparatus said response comprising an indication as to whether said signal has been successfully decoded, and data indicative of at least one of a quality and an interference condition of said selected one of said plurality of channels and of a quality of at least one further one of said plurality of channels in unlicensed spectrum; and means for storing said data indicative of at least one of said quality and said interference condition of said selected one of said plurality of channels and of said quality of said at least one further one of said plurality of channels.

In some embodiments the apparatus further comprises:

means for receiving a signal in one of a plurality of channels in unlicensed spectrum, said signal indicating a further apparatus is transmitting data to said apparatus;

means for performing a scan on at least one of said plurality of channels in unlicensed spectrum to determine whether the at least one of said plurality of scanned channels is available for transmission;

means for decoding said data;

means for generating a response, said response comprising response data indicative of whether said data has been successfully decoded and channel quality data indicative of at least one of:

a quality and an interference condition of said one of said plurality of channels that said signal is received in, and of a quality of at least one further channel of said plurality of channels in unlicensed spectrum; and means for transmitting at least a portion of said response in response to determining that said at least one of said plurality of scanned channels is available.

In some embodiments, said apparatus comprises a user equipment.

A yet further example embodiment provides in a further aspect an apparatus comprising means for:

receiving data from a further apparatus in an unlicensed band;

generating a response comprising acknowledgement information indicating whether the data has been successfully decoded or not and channel quality information related to the unlicensed band;

performing a scan on a channel in the unlicensed band in order to transmit the response to the further apparatus; and transmitting at least a portion of the response in the scanned channel in response to the scan indicating that the scanned channel is available.

In some embodiments, the channel quality information includes: a quality condition of at least one channel in the unlicensed band.

In some embodiments, the channel quality information includes: a quality and an interference condition of a channel that the data is received in and a quality condition of at least one further channel in the unlicensed band.

In some embodiments, the apparatus further comprises: means for decoding the received data.

Various example embodiments provide according to another aspect a network node comprising: a receiver configured to receive a signal in one of a plurality of channels in unlicensed spectrum, said signal indicating that a further network node is transmitting data to said network node and to receive said data; a decoder configured to decode said received data; a channel sensor configured to perform a scan on at least one of said plurality of channels in unlicensed spectrum, to determine whether at least one of said plurality of scanned channels is available for transmission; and a response generator configured to generate a response, said response comprising acknowledgement data indicating whether said data has been successfully decoded and channel quality data indicative of at least one of a quality and an interference condition of said one of said plurality of channels that said signal is received in, and of a quality of at least one further channel of said plurality of channels in unlicensed spectrum; and a transmitter configured, in response to said channel sensor indicating that said at least one of the plurality of scanned channels is available to transmit said response.

In some embodiments, said network node comprises control circuitry configured to determine whether a time elapsed since receipt of said signal is greater than a predetermined time: and where not to control said transmitter to initiate transmission of said channel quality data prior to transmission of said acknowledgement data; and where so to control said transmitter to initiating transmission of at least a portion of said channel quality data after transmission of said acknowledgement data.

In some embodiments, said channel sensor is further configured to: determine data of said at least one of said quality and interference conditions of at least some of said plurality of channels by performing at least one of: determining a received signal reference power in the at least one of said plurality of channels said signal is received in; determining a received signal strength indication for at least some of said plurality of channels including said channel that said signal is received in; and where said signal has not been successfully decoded determining data indicative of the cause of failure based on the received signal strength indication and received signal reference power; and said response generator is configured to generate said determined data as said response.

In some embodiment said network node further comprises a processor configured to select one of a plurality of channels in the unlicensed spectrum for transmitting a signal to at least one further node; a channel sensor configured to perform a scan on said selected channel; a transmitter configured in response to said channel sensor indicating that said selected channel is available, to transmit said signal to said at least one further node on said selected channel; and a receiver configured to receive a response from said at least one further node said response comprising an indication as to whether said signal has been successfully decoded, and data indicative of at least one of a quality and an interference condition of said selected channel and of a quality of at least one further one of said plurality of channels in said unlicensed spectrum; and a data store, said network node being configured to store said data indicative of at least one of said quality and said interference condition of said selected channel and of said quality of said at least one further one of said plurality of channels in said data store.

A still further example embodiment provides in a yet further aspect a network node comprising a processor configured to select one of a plurality of channels in unlicensed spectrum for transmitting a signal to at least one further node; a channel sensor configured to perform a scan on said selected channel; a transmitter configured in response to said channel sensor indicating that said channel is available, to transmit said signal to said at least one further node on said selected channel; and a receiver configured to receive a response from said at least one further node said response comprising an indication as to whether said signal has been successfully decoded, and data indicative of at least one of a quality and an interference condition of said selected channel and of a quality of at least one further one of said plurality of channels in unlicensed spectrum; and a data store, said network node being configured to store said data indicative of at least one of said quality and said interference condition of said selected channel and of said quality of said at least one further one of said plurality of channels in said data store.

In some embodiments, said network node comprises a user equipment.

In some embodiments said processor is configured to select said channel in dependence upon said stored channel quality data.

In some embodiments, said processor is configured in response to said response from said at least one further node indicating that said signal has not been successfully received and decoded, to select a channel for retransmission of said signal in dependence upon said stored channel quality data.

Another example embodiment provides an apparatus comprising: at least one processor; and at least one memory including computer program code; the at least one memory and the computer program code configured to, with the at least one processor, cause the apparatus at least to perform a method according to at least one of a first and second aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Figure 2:
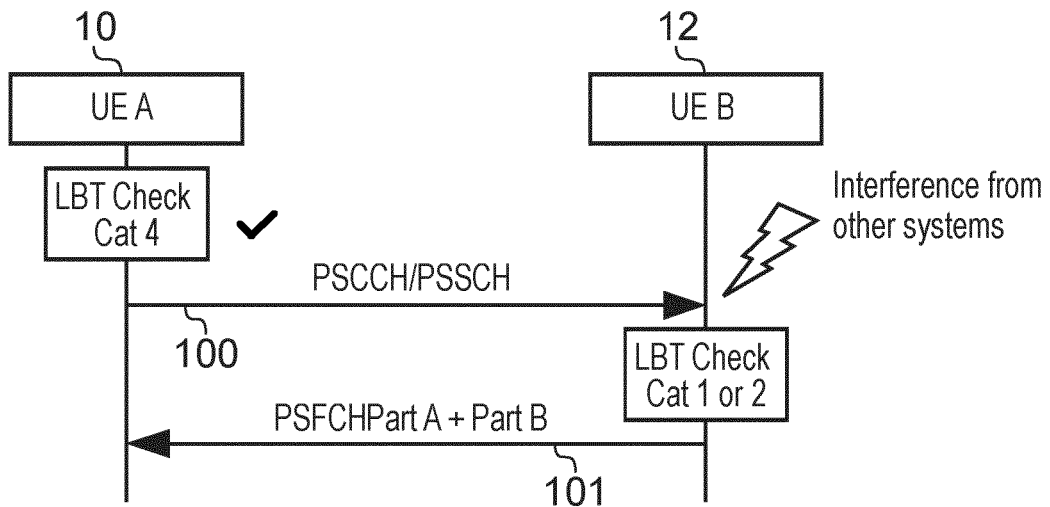
Figure 3:
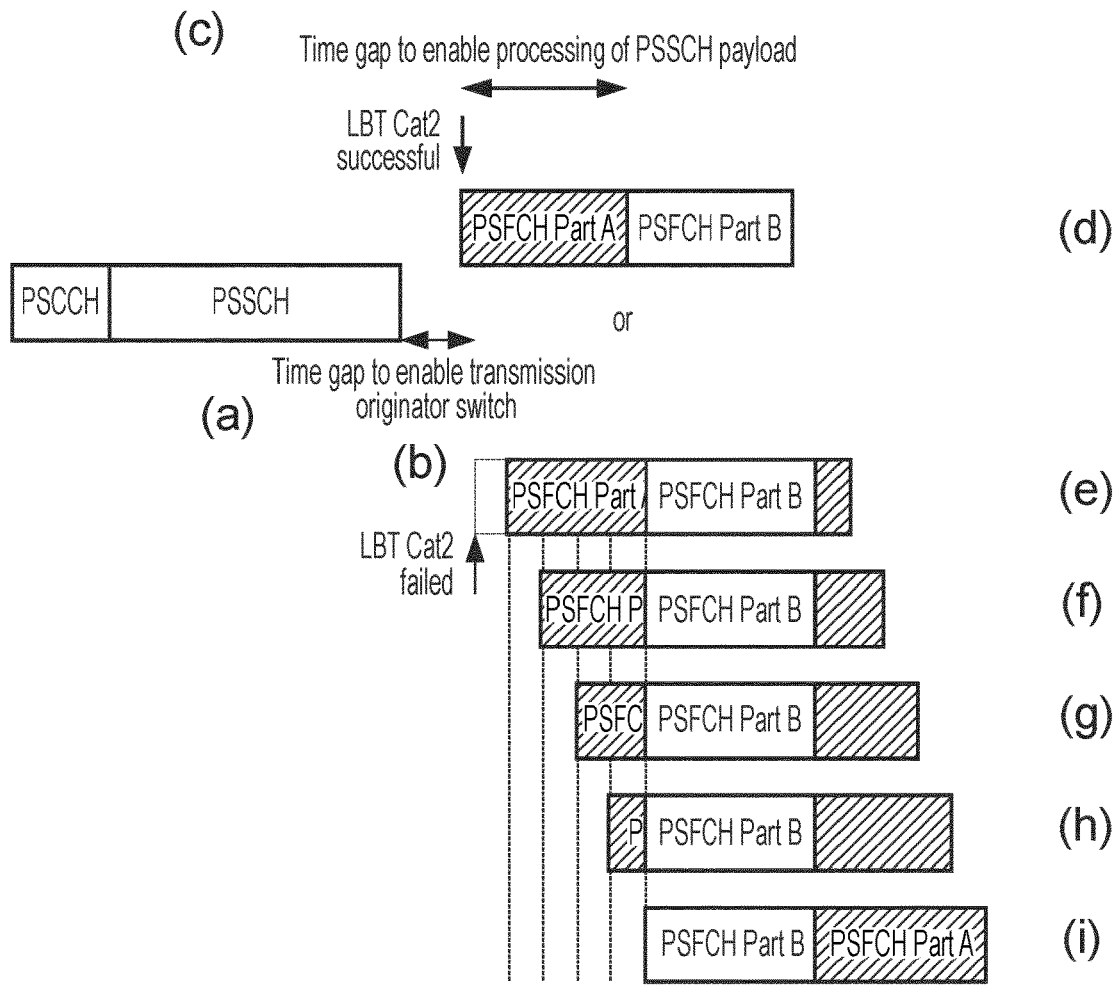
Figure 4:
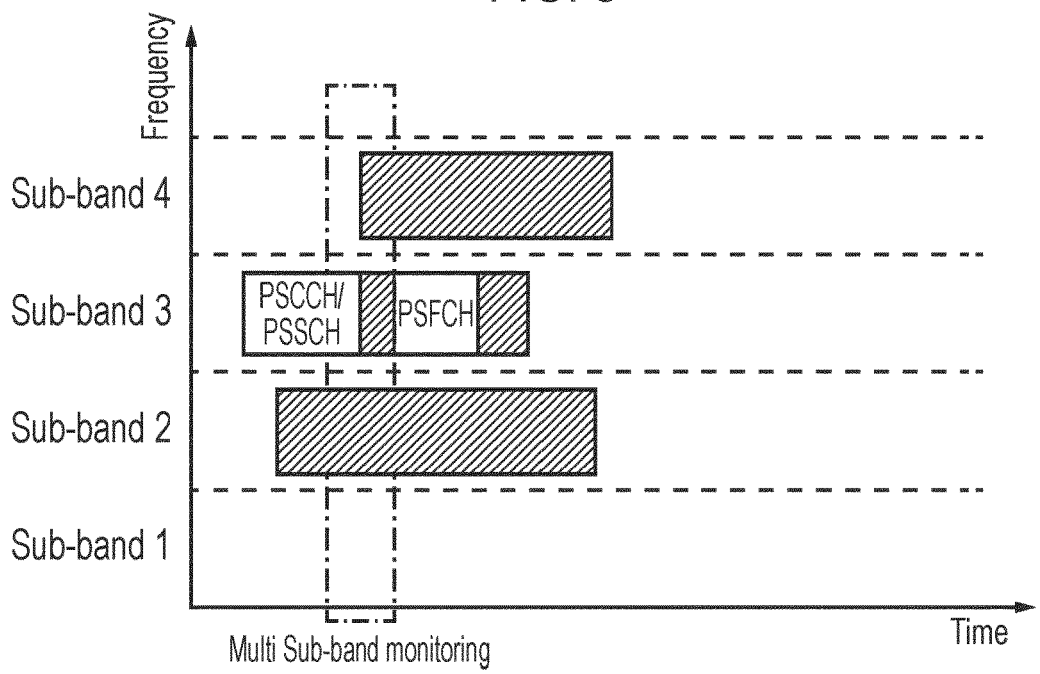
Figure 5:
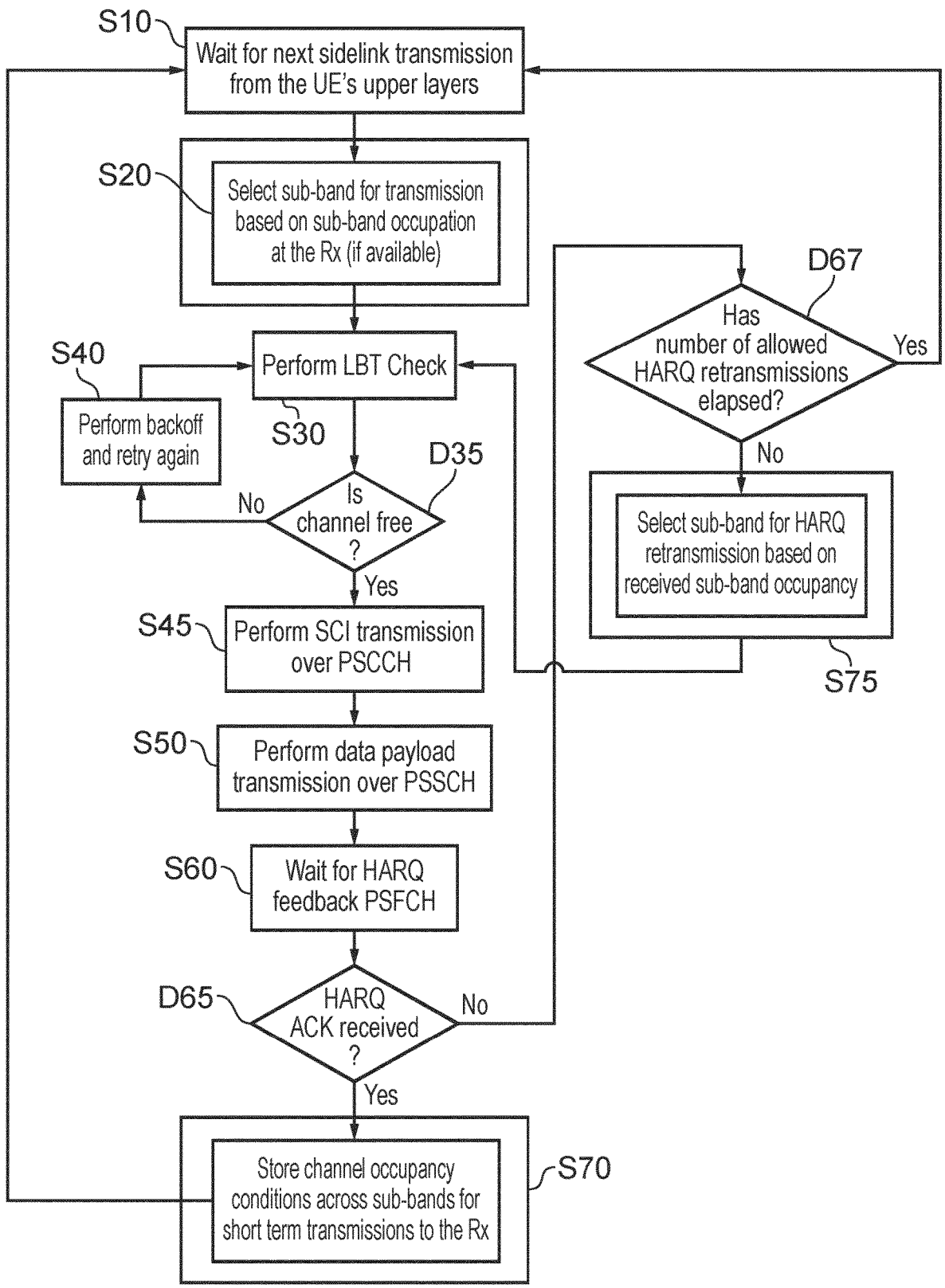
Figure 6:
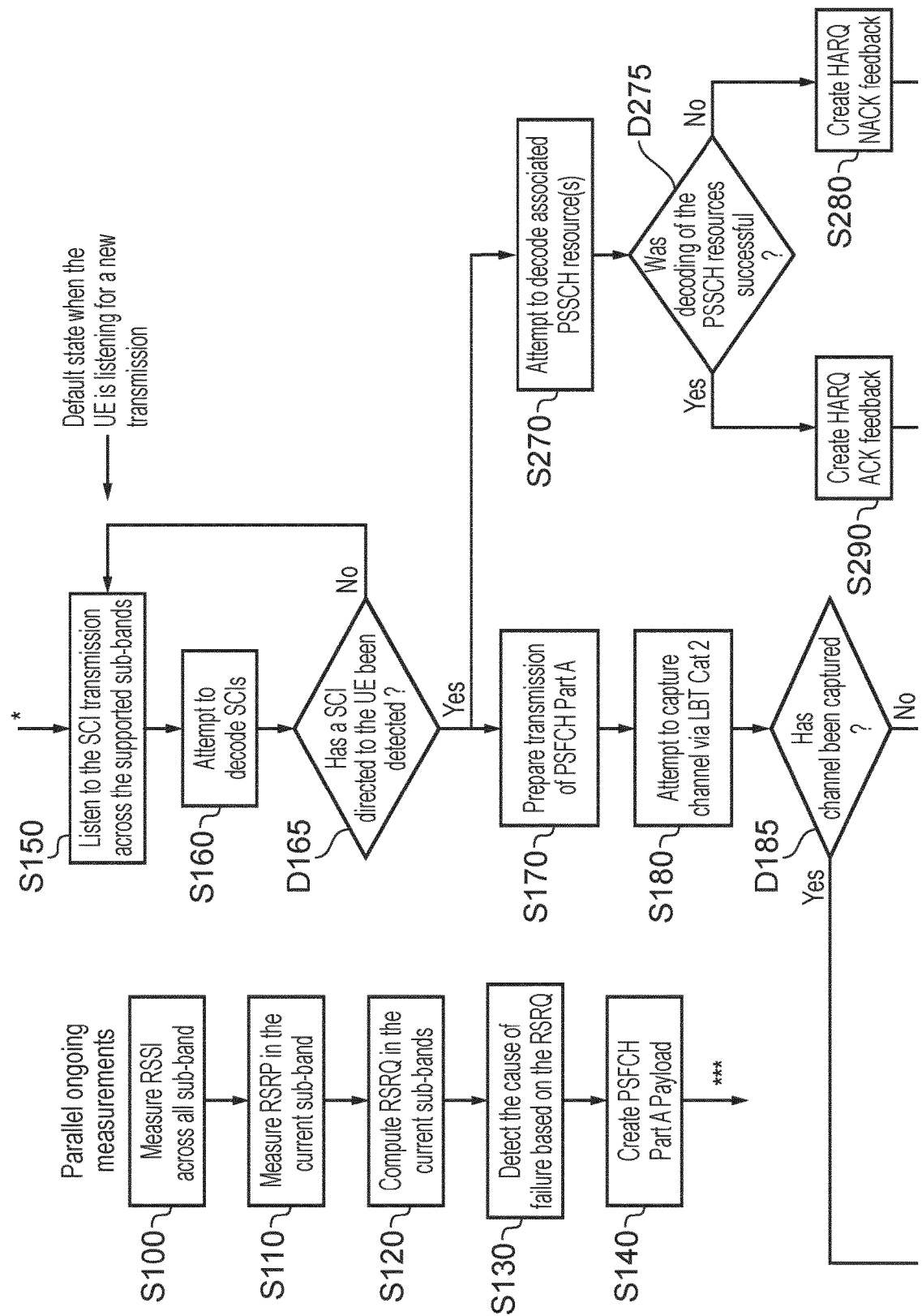
Figure 6:
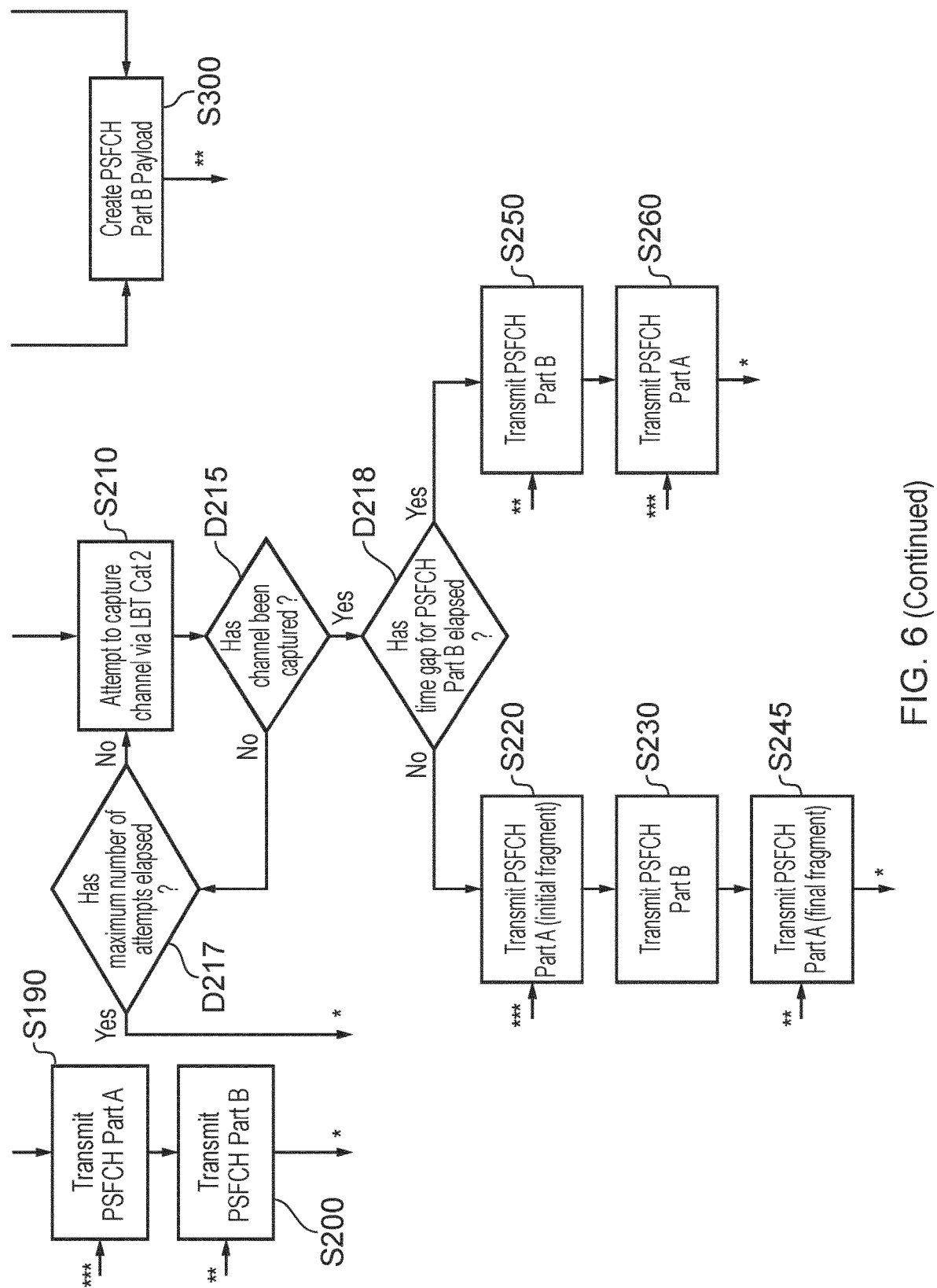
Figure 7:
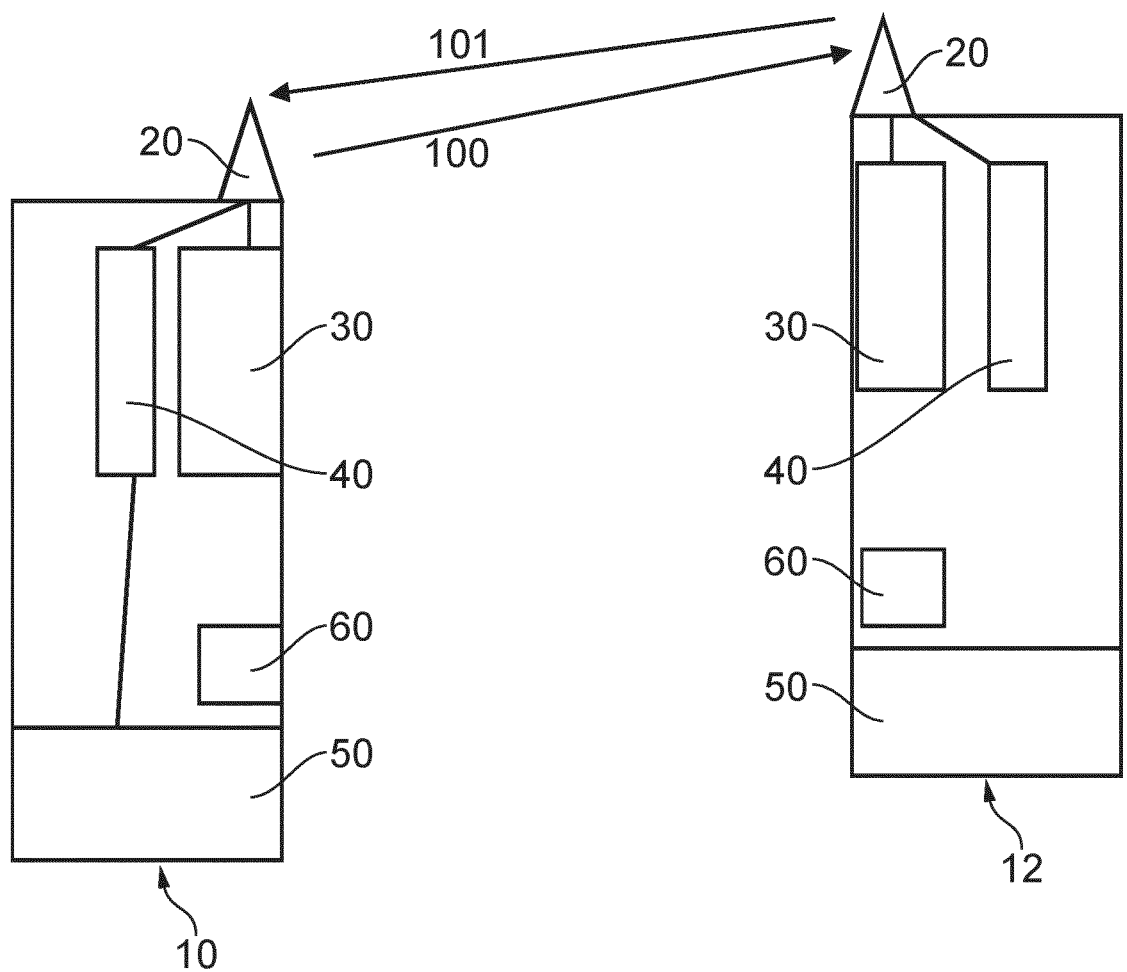
Figure 8:
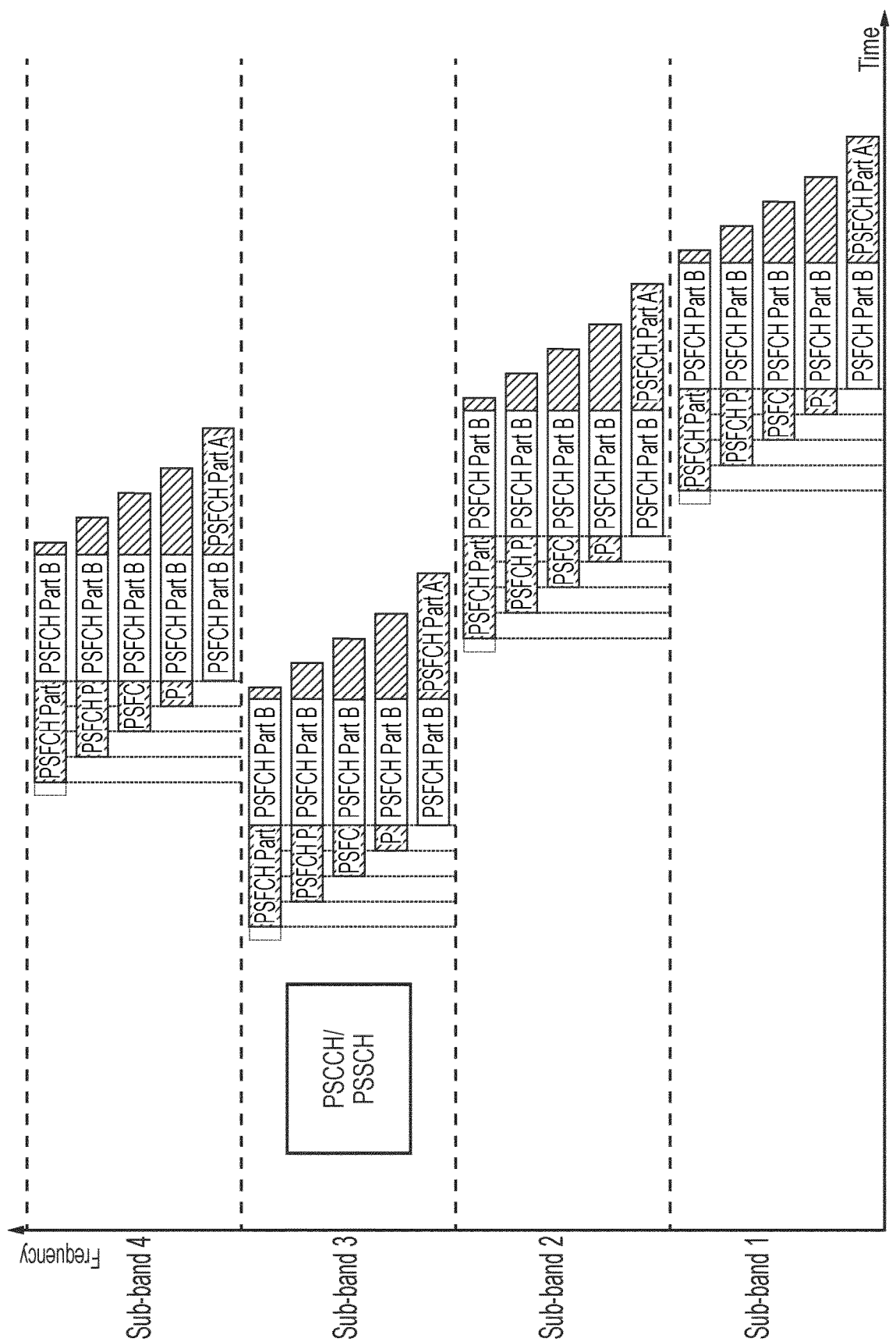
Figure 9:
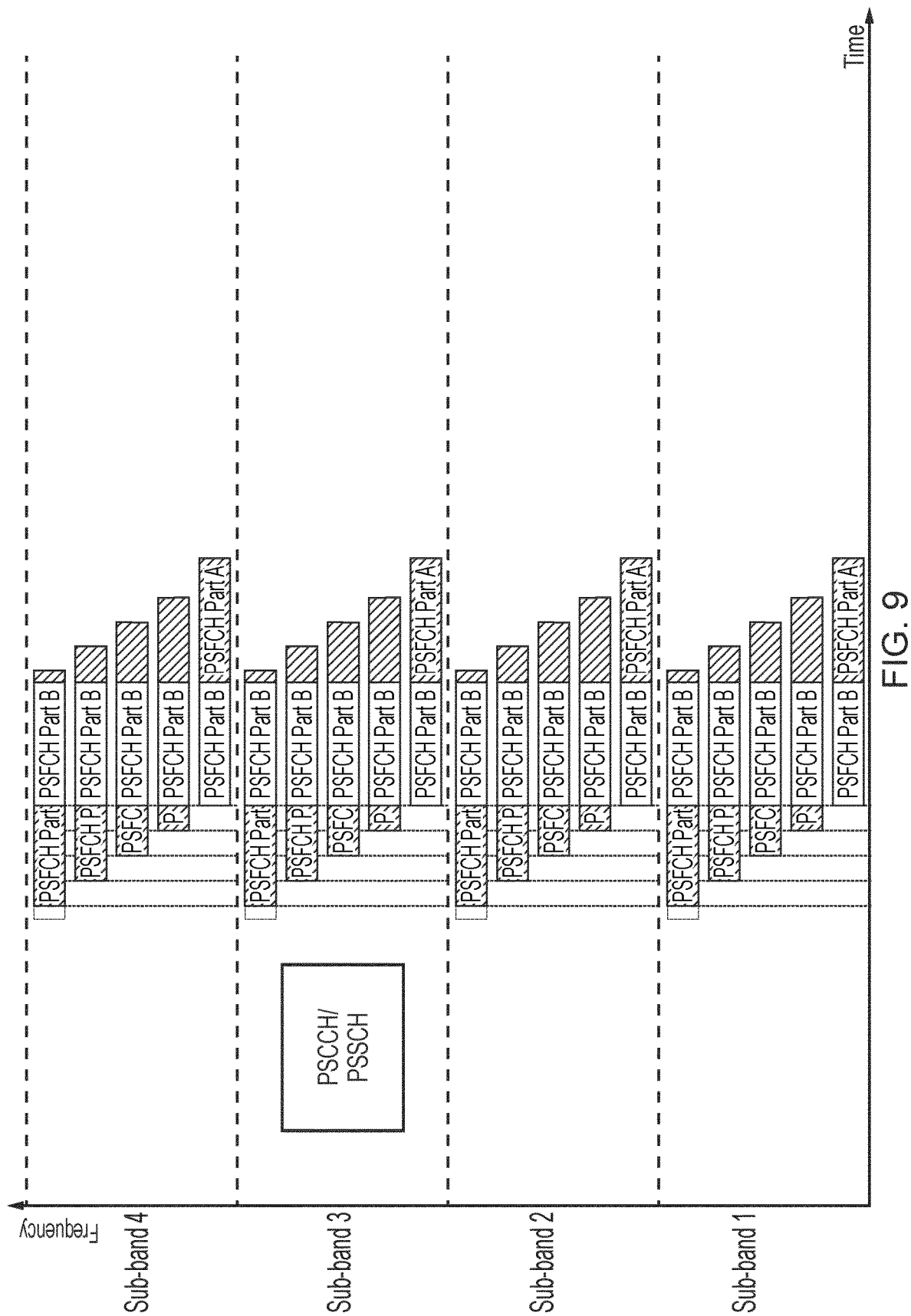

Some example embodiments will now be described with reference to the accompanying drawings in which:

FIG. 1 illustrates potential problems associated with the transmission of the signals in the sidelink unlicensed band due to regulation mandated LBT procedures;

FIG. 2 schematically illustrates an example embodiment of the HARQ process in the unlicensed spectrum with enriched feedback according to an embodiment;

FIG. 3 schematically illustrates the potential timing of the HARQ response signal according to an embodiment;

FIG. 4 schematically illustrates multi sub-band monitoring in order to harvest channel quality information;

FIG. 5 schematically illustrates a flow chart showing an example embodiment of a method performed at a transmission node according to an embodiment;

FIG. 6 schematically shows a flow chart showing an example embodiment of a method performed at a receiving node according to an embodiment;

FIG. 7 schematically shows network nodes according to an example embodiment communicating with each other;

FIG. 8 schematically shows the timings that may occur for transmission of the response where the receiving UE scans multiple channels one after the other; and FIG. 9 schematically shows the timings that may occur for transmission of the response where the UE can scan multiple channels at the same time.

DETAILED DESCRIPTION

Before discussing the example embodiments in any more detail, first an overview will be provided.

Transmissions within the unlicensed spectrum provide opportunities for network nodes to use additional bandwidth in their communication. However, there are challenges associated with such communication and in particular, co-existence with other systems which may be used in these bandwidths should be controlled if the bandwidth is to be shared fairly between the devices and if interference is to be kept to manageable levels.

In sub 7 GHz unlicensed bands co-existence with other systems is provided using a listen before talk (LBT) mechanism. It may be desirable to use some scanning mechanism such as a clear channel assessment CCA or an LBT mechanism in other unlicensed bands.

There are currently potentially four LBT categories:
  category 1—no LBT is used. This is the case where the channel occupancy time (COT) has been acquired by another node. Where the gNB (5g node) shares the COT with a UE, if the UE can listen to the channel and transmit within up to 16 microseconds there is no need to do the LBT again. The COT has a maximum duration defined in regulations.
  Category 2—LBT without random back off; the LBT cat 2 is a fast LBT which usually has a listening period of 25 microseconds at 5 GHz for example and may be used in multi-channel access. Again, it may be used if the gNB and UE are sharing a COT but the interval between transmissions may be larger than 16 microseconds. It is also considered that it may be used for control and high priority signals. The regulations may allow the transmission of short control signals with LBT cat 2 based on some requirements.
  Category 3—LBT with random back off with fixed size contention window, this is currently not used; and
  Category 4—LBT with random back off with variable sizes contention window. This is the LBT used in most situations. The contention window length depends on the channel access priority class and although in situations such as HARQ feedback the channel access priority may be high so that the contention window can be relatively small, say 27 to 63 microseconds where each clear channel system (CCA) slot is 9 microseconds. The contention window is increased when the network node has an explicit indication that there is some congestion in HARQ NACK signal.

The LBT procedure is a regulatory constraint that is applied to nodes that are transmitting and yet any interference will occur at the receiving node and as such the LBT procedure is not robust to the hidden node problem. FIG. 1 illustrates schematically the different potential problems that may arise with using LBT procedures in the unlicensed spectrum with HARQ feedback sidelink signals.

In particular, FIG. 1 shows a UE A 10 performing an LBT check and if the LBT check is successful and a channel in the unlicensed band is free, the UE A 10 transmits a signal comprising a control portion on a physical sidelink control channel (PSCCH) and a data portion on a physical sidelink shared channel (PSSCH). After receiving the PSCCH and the PSSCH, the UE B 12 performs an LBT check in order to check that a channel is free so that UE B 12 can send a response on a physical sidelink feedback channel (PSFCH) indicating that the signal has been received and indicating whether the signal has been successfully decoded or not. If the channel is occupied by the other entity or there is interference from another system, the LBT check will fail and the UE B 12 will perform the LBT check again after a random backoff period.

If the response from UE B 12 indicates that the data portion was not successfully decoded, the transmitting UE, UE A 10 will seek to retransmit the signal (PSCCH and PSSCH) and in order to do this will need to perform a further LBT check to determine that the channel is available. If this fails one or more times, the retransmission will be delayed.

In effect, there are three potential problems, the first problem arises due to interference from other systems at the receiving node. This results in the receiving UE, UE B 12 being unable to decode the received signal so a HARQ NACK is generated. Although a NACK is sent there is no indication sent to the transmitting node UE A 10 as to what the failure was due to.

The second problem arises where the initial LBT check fails and this can prevent or at least delay the HARQ feedback from taking place.

The third problem arises where the delay is such that the COT from the transmission UE 10 is lost and in this case a cat 4 LBT procedure will need to be performed at the receiving UE 12 to acquire the channel which will increase the delay and increase the possibility of further disruptions due to future interference.

FIG. 2 shows an example of enhanced feedback provided from the receiving UE, UE B 12 to the transmitting UE, UE A 10, the enhanced feedback provides information regarding the state of a channel that is used for the transmission and other channels or sub bands in the unlicensed spectrum which may be used.

In this embodiment, the transmitted signal 100 comprises a control portion indicating the node to which the data is to be transmitted and a data payload portion. The control portion is sent in the physical sidelink control channel PSCCH, while the data payload portion is sent in the physical sidelink shared channel PSSCH, these "channels" are time frequency resources within the sub band or channel that the signal 100 is transmitted in.

When the receiving UE, UE B 12, receives the signal 100, it determines from the control portion whether the signal is addressed to it. If so, UE B 12 seeks to decode the data in the data payload. When the decoding process has finished then UE B 12 generates a response 101 to the transmitted signal 100, the response 101 comprising a portion, part B, indicating whether the decoding has been successful or not, this portion of the response takes the form of an acknowledgement signal (e.g. ACK or NACK).

In addition to generating part B of response 101, UE B 12, also generates an enhanced feedback portion for the response 101, termed part A of the response. Part A includes information regarding at least one of congestion status, quality of the active sidelink in a current sub-band (or channel) and congestion information about the other sub-bands. In this regard, the congestion status and quality of the active sidelink is provided in the form of a receive signal strength indication (RSSI) and receive signal reference quality (RSRQ), whereas the information about the other sub-bands is in the form of RSSI.

In one of embodiments, the UE B 12 is able to transmit the Part A and the Part B to the UE A 10 via the PSFCH, if a channel for PSFCH is free after the carrier sensing (e.g., LBT check cat 1 or 2).

In one of the other embodiments, as part B of the response 101 is generated following the decoding of the data payload portion of signal 100 the generation of this part of the response 101 requires a specific processing time, thus, in some embodiments part A of the response 101 indicative of the channel quality is sent before part B during the period of time that part B is being generated. Furthermore, as it is expected that there will be a time gap between receipt of the transmitted signal 100 and the response 101 sent via the PSFCH, and the time gap may well be higher than 16 microseconds, then a further channel scan such as an LBT check (for example, LBT category 2) may be necessary in order to guarantee the channel availability.

So, prior to any response 101 being transmitted, UE B 12 performs a channel sensing in this case an LBT check to see if the physical sidelink feedback channel (PSFCH) is free and if the LBT check fails, the UE B 12 reattempts channel access with an LBT Cat 2 as long as the UE A's COT is still valid. This procedure may be performed until the UE B 12 succeeds with the channel access. If the LBT fails continuously, the UE B may stop channel access attempts or re-attempt the channel access with a predetermined number of LBTs.

In summary, the response 101 is sent on the PSFCH once the LBT has succeeded. The response 101 comprises a part A and a part B. In this case, the part A of the response 101 will be sent until the decoding and transmission switch time gap has passed at which point the part B is ready to be sent and this is prioritised. If the LBT fails multiple times then the channel may not be ready for transmission of a response until a time at which the part B is ready for transmission and in this case part A of response 101 will be transmitted after part B.

This is illustrated in more detail in FIG. 3. As can be seen the transmitted signal 100 arrives with the control portion PSCCH part of the signal indicating the UE 12 that is to receive the signal and the data portion PSSCH part comprising the data payload. The UE 12 that receives the signal cannot respond to it until it has switched from receive to transmission mode and has successfully performed an LBT check to verify that the channel is available. As the receiving UE 12 has acquired the channel the check may be a cat2 check. When the LBT check has been successfully performed and a switch to transmission mode made, the UE 12 is ready to transmit a response 101 to the transmitting UE 10. However, the data may not yet be decoded so part B of the response cannot be sent yet, thus, at this point data regarding the status of the channels part A of the response can be sent, and then once the decoding process is complete part B can be sent (example (d) of the Figure).

If the LBT procedure fails then there is a delay before the receiving UE 12 can respond to the signal during which time it repeats the LBT procedure. This is shown in examples (e), (f), (g), (h) and (i) in FIG. 3 where the LBT check fails one or multiple times. In each case, the time for initiating the response 101 becomes more and more delayed and thus, the time before part B of the response is ready for transmission becomes shorter and shorter and thus, the portion of the response regarding the channel quality (the part A) is transmitted in the shorter and shorter time period that is available before the time when part B can be transmitted. In this case the remaining part of the data regarding channel quality part A may be transmitted after part B has been transmitted. As can be seen it is part B regarding whether or not the signal has been received successfully that is prioritised as it is this that the transmitting node is waiting for. The channel quality part of the response signal (part A) simply helps the transmission node in later transmissions.

In order to compile the information that is to be transmitted as the enriched feedback (PSFCH part A), the UE B 12 measures the surrounding sub-bands or channels and also detects the reason for failure of the original transmission from UE A 10. The measurements that are performed may include:

for the non-active sub-bands—the measurement of the status of the surrounding sub-bands via RSSI measurements;

for the currently active sub-band—the detection of the cause of failure of the original transmission, this may be done by measuring RSSI and RSRP (received reference signal power) and comparing RSSI with RSRP and obtaining RSRQ, which is computed as RSRQ=RSRP/RSSI. This is similar to SINR signal to noise ratio but applied to reference signals.

FIG. 4 schematically shows multiple sub-band monitoring to determine information regarding the channel quality and congestion of the different channels, including the channel that was selected by UE A 10 for transmitting the signal to which a response is then required, which in this embodiment is sub-band 3.

FIG. 5 shows a flow diagram illustrating steps performed in a method according to an example embodiment at the transmitting node UE A 10.

In an initial step S10 the transmission UE A 10 waits for the next sidelink transmission slot or resource allocation from the UE's upper layers. On receiving the sidelink transmission slot UE A selects in step S20 a sub-band for transmission of the PSCCH and the PSSCH. The selection of the sub-band is based on the channel quality and/or occupation of the sub-band at the receiving UE 12 if this information is available. This is information that may have been received and stored from response signals received from UEs in previous communications. If there is no information available then UE A 10 will simply select any one of the available channels or sub-bands. An LBT check will then be performed at step S30 on the selected sub-band to determine if the channel is free. This may be a category 4 LBT check.

If the channel is determined to be free in step D35 the signal (100 in FIG. 2) will be transmitted and the channel will be acquired for a channel occupation time COT. The signal will be transmitted in two parts, one part is the control portion in the form of sidelink control information which among other things indicates the destination UE or UEs and this is transmitted in step S45 over PSCCH. The other part is transmitted in step S50 and comprises the data payload transmitted over PSSCH. If the channel is not free, then the UE will perform a backoff in step S40 and then it will perform the LBT check again in step S30.

The transmission UE A 10 then waits for a response in step S60 to determine whether the data payload has been correctly received or needs to be resent. The response may be a HARQ feedback response. Where it is some other encoded signal then it will wait for the appropriate feedback for that signal. In this embodiment the response signal is formed of two parts, part B being indicative of whether the signal has been successfully decoded and part A being indicative of the quality/congestion of the channels. Step D65 determines whether part B of the response is positive an ACK signal indicating that the data payload has been successfully decoded or negative a NACK signal. If it is an ACK signal then at step S70 the channel occupancy conditions across the sub-bands (derived from part A of the response 101 in FIG. 2) are stored for use in near future transmissions to the receiver and the method returns to step S10 to wait for the next sidelink transmission. The information stored in step S70 can be used in step S20 for the selection of a sub-band for any subsequent transmission.

If a NACK has been received at D65 indicating that the data payload of the transmitted signal has not been successfully decoded at the receiving UE B 12, then the transmitting UE A 10 determines at D67 whether or not the maximum number of allowed retransmissions has elapsed. If they have elapsed then UE A 10 returns to step S10 to wait for the next sidelink transmission slot from the UE's upper layers.

If at step D67 the UE determines that the maximum number of allowed retransmissions has not elapsed, then the UE may at step S75 select a sub-band for retransmisson of the signal, this sub-band will be selected based on the received sub-band occupancy derived from part A of the received response signal.

FIG. 6 shows the behaviour at the receiving node UE B 12. At step S150 the receiving UE, UE B 12 listens to transmissions in the control plane across the supported channels or sub-bands and if it receives a transmission it will attempt at step S160 to decode sidelink control information (SCIs) to determine if the SCI is directed to the UE B 12 or to another UE.

If it determines at step D165 that it is directed to the receiving UE B 12 then it will attempt at step S270 to decode the data payload transmitted via the PSSCH and if the decoding is successful it will create a response (e.g., the HARQ feedback) at step S290 to that effect. If it is determined at step D275 that UE B 12 is unsuccessful at decoding the data at step S270 then at step S280 it will generate a response to indicate this—a HARQ NACK feedback signal. This is part B of the response at step S300.

In addition to creating this part B response an enhanced feedback signal, part A of the response is also created and at least some of the steps performed creating the part A portion of the response signal are performed in the background by the receiving UE, UE B 12 and may not be triggered by receipt of the signal 100. This is shown by steps S100 to S140 and comprises UE B 12 measuring the RSSI across all the supported channels or sub-bands in step S100 and measuring the RSRP in the current sub-band in step S110 and in step S120 computing the RSRQ in the current sub-band and detecting the cause of failure of a transmission based on the RSRQ in step S130. UE B 12 will then create the part A feedback in step S140 which comprises the RSSI's of the available sub-bands or channels along with the cause of failure of the current sub-band or channel. In effect in this example embodiment the detection of the cause of failure of detecting and/or decoding the data payload portion of the signal is determined based on comparing the computed RSRQ with a predefined threshold.

If the receiving UE, UE B 12 has determined at step D165 that the SCI is directed to the UE B 12 then it will prepare a transmission of PSFCH part A of the response signal at step S170 and it will perform an LBT procedure (or, a first carrier sensing procedure) at step S180, which where the COT of the transmission UE A 10 is still valid is an LBT cat 2. If it is able to capture the channel at step D185, the UE B 12 can then transmit a response to the transmitting UE A 10 and will initially transmit part A of the response indicating channel quality at step S190 followed by the part B response the HARQ ACK or NACK at step S200 once this has been generated.

If the initial LBT procedure is unsuccessful and the channel is not captured at D185 the UE B 12 will perform a subsequent LBT procedure (or, second carrier sensing procedure) at step S210 and when the LBT is successful at step D215 the UE B 12 will determine at D218 the time gap since the original signal was received and if the time gap for generating part B of the response has elapsed the UE will perform step S250 and transmit PSFCH part B of the response followed at step S260 by part A of the response. If the time gap has not elapsed then at step S220 a portion of part A of the response will be transmitted until the time gap for generating part B has elapsed whereupon part B will be transmitted at step S230 followed by the final portion of part A at step S245.

If it is determined at D217 that the LBT procedure is not successful a maximum number of times then the UE B 12 will stop trying to respond and will listen for a new transmission.

FIG. 7 shows two network nodes 10, 12 according to an embodiment. Network node 10 is a transmission network node while network node 12 is a receiving network node. In many embodiments each network node is configured to both receive and transmit signals.

Each network node comprises an antenna 20 for transmitting and receiving electromagnetic wireless signals.

Transmitting network node 10 comprises processor 50 which comprises, encoding, decoding and control circuitry or means and which is configured to respond to an instruction to transmit a signal to network node 12, by generating and encoding the signal, the generated signal comprising a control portion indicating the destination UE 12 and the encoded data payload. This information is then forwarded to transmitting control circuitry 40 which controls antenna 20 to transmit the signal 100. Prior to transmitting the signal, as the transmission is to be in the unlicensed band, a channel needs to be acquired and thus, processor 50 controls receiving circuitry 30, which is configured to sense and receive signals in different channels, to sense a selected one of the channels in the unlicensed spectrum to determine if it is available for transmission using an LBT procedure. The channel is sensed for a predetermined time and if it is available the channel is acquired for a COT on transmission of the signal 100. The channel that is selected for transmission may be selected based on channel quality information that may be stored in data store 60.

In some embodiments where the device cannot transmit and receive at the same time, the processor 50 will control a switch between the receiving circuitry and transmitting circuitry 40, and the signal 100 generated from processor 50 will be transmitted using transmitting circuitry 40 and antenna 20 towards network node 12.

The node 10 will then switch to receiving mode, where the receiving circuitry 30 listening for a response 101 and on receipt of a response 101, will determine from the response 101, whether signal 100 was received and decoded successfully by node 12. Where it was, then receiving circuitry 30 will forward the channel quality portion of the signal to data store 60 for storage, where it was not then processor 50 will determine from the channel quality information why the signal failed and whether retransmission should be attempted on the same channel or on a different channel.

Receiving network node 12 will be monitoring for incoming signals across multiple channels using receiving circuitry 30 that includes channel sensing circuitry and on detection of a signal 100 will decode the control portion using a decoder within processor 50 and will determine from this signal if the signal is addressed to itself. If it is then it will decode the data portion of the signal using the decoder. In addition to sensing for incoming signals on the control channel, the receiving node will also be determining the quality of the multiple channels or sub-bands that are available in the unlicensed spectrum using the receiving circuitry 30 and will store this information in data store 60. On receiving a signal on a channel it will also monitor for interference to that signal and will store that information in data store 60.

Having received a signal 100 addressed to itself, the receiving network node 12, will in addition to decoding the signal, monitor the channel the signal 100 was received on using a listen before talk procedure to determine whether the channel is available for a response. As the transmitting node will have acquired the channel a category 2 LBT procedure can be performed at least in the first instances. Once it is determined that the channel is available, the node generates a feedback response 101 to the received signal and this is output by transmitting circuitry 40. The generated signal 101 comprises an enhanced feedback portion that comprises information regarding the quality of the sensed channels and a response to the signal indicating if it has been successfully received and decoded. Where the LBT procedure is successful on the first try the enhanced feedback portion part A will be sent first and the response portion part B will be sent when it has been generated, following decoding of the original signal 100. Where there is a delay in responding due to the LBT check failing initially then the response feedback portion part B may be sent before at least a part of the channel quality portion part A.

FIG. 8 and FIG. 9 show potential timings for transmitting a response 101 according to different embodiments, where channels or sub-bands other than the one the signal is received in (sub-band 3) are scanned to see if they are available for transmitting a response. It should be noted that although the figures show the timings for transmission of a response 101 in each sub-band this is simply to show the timings of the response, only one response will be transmitted in a sub-band that is selected following the scan. In this regard in the embodiment of FIG. 3, the UE B 12 scans the sub-band or channel that the signal 100 was received in to determine if the sub-band is available for transmitting the response and transmits the response when the channel is available, the amount of part A is transmitted before part B depending on when the channel becomes available (as is shown in more detail in FIG. 3). In the embodiments of FIG. 8 and FIG. 9 the UE scans other channels not only to determine channel quality in the background but also to perform a check to see if the channel (sub-band) is available for transmission of the response, these scans may be done in parallel (see FIG. 9), or multiplexed in time (see FIG. 8).

In FIG. 8 the UE B 12 scans sub-band 3 first and if it is not available scans the other channels, one after the other until one is detected to be available and then the response is sent. The UE transitions to check a new sub-band if the scan is not successful within a specified time. Where the available channel is a different sub-band to the one the signal 100 is received then for the case where the scan is an LBT check the channel will not have been acquired by the transmitting UE and will need to be acquired. In the example of FIG. 9, the UE 12 is able to scan multiple channels together and thus, several sub-bands are scanned and an available sub-band selected for transmission of the response 101. In the examples of FIG. 8 and FIG. 9, the possible timings for the transmission of the responses in each sub-band is shown, just one of the responses 101 will actually be transmitted in one of the sub-bands, the one that is transmitted depending on the timing of the availability of the sub-band.

In summary example embodiments provide a system which allows:

Identification of the cause of the PSSCH decoding failure, so that the UE Tx (UE A 10) can decide on how to proceed with the retransmission (e.g. use the same sub-band or switch to a less congested sub-band);

the Rx UE (UE B 12) to have multiple opportunities to capture the channel (i.e. obtain a favourable LBT outcome) and perform the transmission of its feedback.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of feedback over sidelink, comprising:
receiving, by a second user equipment (UE) a signal over sidelink from a first UE, wherein the signal comprises a control portion and a data payload portion, wherein the control portion indicates a node to which data is to be transmitted and the data payload portion is sent in a physical sidelink shared channel (PSSCH);
measuring a receive signal strength indication (RSSI) across all supported channels or a sub-bands;
measuring a receive signal reference quality (RSRP) in the current sub-band;
computing the RSRQ in the current sub-band;
detecting a cause of failure of a transmission based on the RSRQ; and
creating part A comprising:
the RSSI's of the sub-bands or the channels that are available; and
the cause of the failure of the current sub-band;
decoding sidelink control information (SCIs) from the signal;
determining the SCI is directed to the second UE;
based on determining the SCI is directed to the second UE, initiating a decoding the data payload portion sent in the PSSCH;
creating part B comprising an indication as to whether the decoding of the data payload portions was successful;
generating, by the second UE, a response to the received signal, wherein the response comprises the part A and the part B, wherein part A further comprises information regarding: congestion status, and quality of the active sidelink in the current sub-band and congestion information about other sub-bands;
preparing a transmission, by the second UE, a portion of the response comprising the part A via a physical sidelink feedback channel (PSFCH);
attempting to capture a channel by performing a listen before talk (LBT) category 2 procedure, wherein the category 2 LBT is without random back off and has a listening period of 25 microseconds at 5 GHz and is used in multi-channel access;
based on the channel not being captured, performing a subsequent LBT category 2 procedure;
based on the subsequent LBT category 2 procedure being successful in capturing the channel, determining a time gap since the signal over the sidelink was received;
based on the time gap not elapsing, transmitting a first portion of the response comprising an initial fragment of the part A via PSFCH;
after the time gap has elapsed, transmitting a second portion of the response comprising the part B followed by a third portion of the response comprising a final fragment of the part A.

2. The method according to claim 1, comprising:
sensing, by the second UE, a channel to check whether the PSFCH is free.

3. The method according to claim 2, wherein the sensing comprises LBT, LBT category 1 or 2.

4. The method according to claim 1, wherein the part B indicates whether the decoding of the received signal has been successful comprises a hybrid automatic repeat request (HARQ) response.

5. An apparatus comprising:
at least one processor; and
at least one memory comprising computer program code, the at least one memory and the computer program code configured to, with the at least one processor, cause the apparatus at least to perform:
receiving, by a second user equipment (UE) a signal over sidelink from a first UE, wherein the signal comprises a control portion and a data payload portion, wherein the control portion indicates a node to which data is to be transmitted and the data payload portion is sent in a physical sidelink shared channel (PSSCH);
measuring a receive signal strength indication (RSSI) across all supported channels or a sub-bands;
measuring a receive signal reference quality (RSRP) in the current sub-band;
computing the RSRQ in the current sub-band;
detecting a cause of failure of a transmission based on the RSRQ; and creating part A comprising:
   the RSSI's of the sub-bands or the channels that are available; and
   the cause of the failure of the current sub-band;
decoding sidelink control information (SCIs) from the signal;
determining the SCI is directed to the second UE;
based on determining the SCI is directed to the second UE, initiating a decoding the data payload portion sent in the PSSCH;
creating part B comprising an indication as to whether the decoding of the data payload portions was successful;
generating, by the second UE, a response to the received signal, wherein the response comprises the part A and the part B, wherein part A further comprises information regarding: congestion status, and quality of the active sidelink in the current sub-band and congestion information about other sub-bands;
preparing a transmission, by the second UE, a portion of the response comprising the part A via a physical sidelink feedback channel (PSFCH);
attempting to capture a channel by performing a listen before talk (LBT) category 2 procedure, wherein the category 2 LBT is without random back off and has a listening period of 25 microseconds at 5 GHz and is used in multi-channel access;
based on the channel not being captured, performing a subsequent LBT category 2 procedure;
based on the subsequent LBT category 2 procedure being successful in capturing the channel, determining a time gap since the signal over the sidelink was received;
based on the time gap not elapsing, transmitting a first portion of the response comprising an initial fragment of the part A via PSFCH;
after the time gap has elapsed, transmitting a second portion of the response comprising the part B followed by a third portion of the response comprising a final fragment of the part A.

6. The apparatus according to claim 5, wherein the part B indicates whether the decoding of the received signal has been successful comprises a hybrid automatic repeat request, HARQ, response.

* * * * *